(12) United States Patent
Jin et al.

(10) Patent No.: US 11,721,324 B2
(45) Date of Patent: Aug. 8, 2023

(54) PROVIDING HIGH QUALITY SPEECH RECOGNITION

(71) Applicant: International Business Machines Corporation, Armonk, NY (US)

(72) Inventors: Yuan Jin, Shanghai (CN); Xi Xi Liu, Shanghai (CN); Li ping Wang, Shanghai (CN); Fan Xiao Xin, Shanghai (CN); Zheng Ping Chu, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 77 days.

(21) Appl. No.: 17/343,431

(22) Filed: Jun. 9, 2021

(65) Prior Publication Data
US 2022/0399006 A1    Dec. 15, 2022

(51) Int. Cl.
*G10L 15/30* (2013.01)
*G10L 15/02* (2006.01)
(Continued)

(52) U.S. Cl.
CPC ............... *G10L 15/02* (2013.01); *G06N 3/08* (2013.01); *G10L 25/30* (2013.01); *G10L 25/51* (2013.01)

(58) Field of Classification Search
CPC .......... G10L 15/02; G10L 25/30; G10L 25/51
(Continued)

(56) References Cited

U.S. PATENT DOCUMENTS 6,029,124 A * 2/2000 Gillick .................. G10L 15/08
704/E17.011
9,600,231 B1 * 3/2017 Sun .......................... G10L 15/14
(Continued)

FOREIGN PATENT DOCUMENTS

| CN | 106776806 A | 5/2017 |
|---|---|---|
| WO | 2019161193 A2 | 8/2019 |
| WO | 2020091123 A1 | 5/2020 |

OTHER PUBLICATIONS

D. O'Shaughnessy, "Interacting with computers by voice: automatic speech recognition and synthesis," in Proceedings of the IEEE, vol. 91, No. 9, pp. 1272-1305, Sep. 2003, doi: 10.1109/JPROC.2003. 817117. (Year: 2003) (Year: 2003).*

(Continued)

*Primary Examiner* — Bharatkumar S Shah
(74) *Attorney, Agent, or Firm* — Robert A. Voigt, Jr.; Shackelford, Bowen, McKinley & Norton, LLP

(57) ABSTRACT

A computer-implemented method, system and computer program product for providing high quality speech recognition. A first speech-to-text model is selected to perform speech recognition of a customer's spoken words and a second speech-to-text model is selected to perform speech recognition of the agent's spoken words during a call. The combined results of the speech-to-text models used to process the customer's and agent's spoken words are then analyzed to generate a reference speech-to-text result. The customer speech data that was processed by the first speech-to-text model is reprocessed by multiple other speech-to-text models. A similarity analysis is performed on the results of these speech-to-text models with respect to the reference speech-to-text result resulting in similarity scores being assigned to these speech-to-text models. The speech-to-text model with the highest similarity score is then selected as the new speech-to-text model for performing speech recognition of the customer's spoken words during the call.

20 Claims, 8 Drawing Sheets

(51) Int. Cl.
  *G06N 3/08* (2023.01)
  *G10L 25/51* (2013.01)
  *G10L 25/30* (2013.01)

(58) Field of Classification Search
  USPC .......................................................... 704/200
  See application file for complete search history.

(56) References Cited

U.S. PATENT DOCUMENTS

| | | |
|---|---|---|
| 10,062,385 B2 | 8/2018 | Cook et al. |
| 10,468,019 B1 | 11/2019 | Pemba et al. |
| 2005/0010411 A1 | 1/2005 | Rigazio et al. |
| 2019/0121860 A1 | 4/2019 | Mirza et al. |
| 2019/0122653 A1 | 4/2019 | Tapuhi et al. |
| 2019/0220245 A1 | 7/2019 | Martel et al. |
| 2019/0332680 A1 | 10/2019 | Wang et al. |
| 2019/0371335 A1 | 12/2019 | Shastry et al. |
| 2021/0074280 A1 | 3/2021 | Chao et al. |
| 2021/0142805 A1* | 5/2021 | Shastry ................... G10L 15/22 |
| 2022/0172707 A1* | 6/2022 | Wang ..................... G10L 15/183 |

OTHER PUBLICATIONS

J. Su and O. Boydell, "TopicListener: Observing Key Topics from Multi-channel Speech Audio Streams," 2016 IEEE Second International Conference on Big Data Computing Service and Applications (BigDataService), 2016, pp. 85-94, doi: 10.1109/BigDataService. 2016.23. (Year: 2016) (Year: 2016).*

\* cited by examiner

PROVIDING HIGH QUALITY SPEECH RECOGNITION

TECHNICAL FIELD

The present disclosure relates generally to speech recognition, and more particularly to providing high quality speech recognition via self-adaptive speech-to-text model reselection and continuous speech-to-text model self-training, tuning and customization.

BACKGROUND

Speech recognition is an interdisciplinary subfield of computer science and computational linguistics that develops methodologies and technologies that enable the recognition and translation of spoken language into text by computers. It is also known as automatic speech recognition (ASR), computer speech recognition or speech-to-text (STT). It incorporates knowledge and research in the computer science, linguistics and computer engineering fields.

Speech recognition is used in various technological areas, especially in call centers, where speech recognition software is used to handle incoming customer calls to improve productivity, customer satisfaction and cut costs. By transforming audio (e.g., customer's spoken words) into text-based words, events or words spoken during the telephone call can be indexed and searched. This indexable, searchable content can be used for training new agents and establishing best practices.

SUMMARY

In one embodiment of the present disclosure, a computer-implemented method for providing high quality speech recognition comprises selecting a first speech-to-text model to perform speech recognition of words spoken by a customer. The method further comprises selecting a second speech-to-text model to perform speech recognition of words spoken by an agent. The method additionally comprises analyzing combined results of the first and second speech-to-text models to generate a reference speech-to-text result. Furthermore, the method comprises reprocessing cached customer speech data with a plurality of speech-to-text models to perform speech recognition of the customer's spoken words in response to a confidence rate of a speech-to-text result performed by the first speech-to-text model not exceeding a threshold value. Additionally, the method comprises performing a similarity analysis on results of the plurality of speech-to-text models with respect to the reference speech-to-text result. In addition, the method comprises assigning similarity scores for each of the plurality of speech-to-text models based on the similarity analysis. The method further comprises selecting one of the plurality of speech-to-text models with a highest similarity score as a new speech-to-text model for speech-to-text processing of words spoken by the customer during an ongoing call.

Other forms of the embodiment of the computer-implemented method described above are in a system and in a computer program product.

The foregoing has outlined rather generally the features and technical advantages of one or more embodiments of the present disclosure in order that the detailed description of the present disclosure that follows may be better understood. Additional features and advantages of the present disclosure will be described hereinafter which may form the subject of the claims of the present disclosure.

BRIEF DESCRIPTION OF THE DRAWINGS

A better understanding of the present disclosure can be obtained when the following detailed description is considered in conjunction with the following drawings, in which.

DETAILED DESCRIPTION

Figure 1:
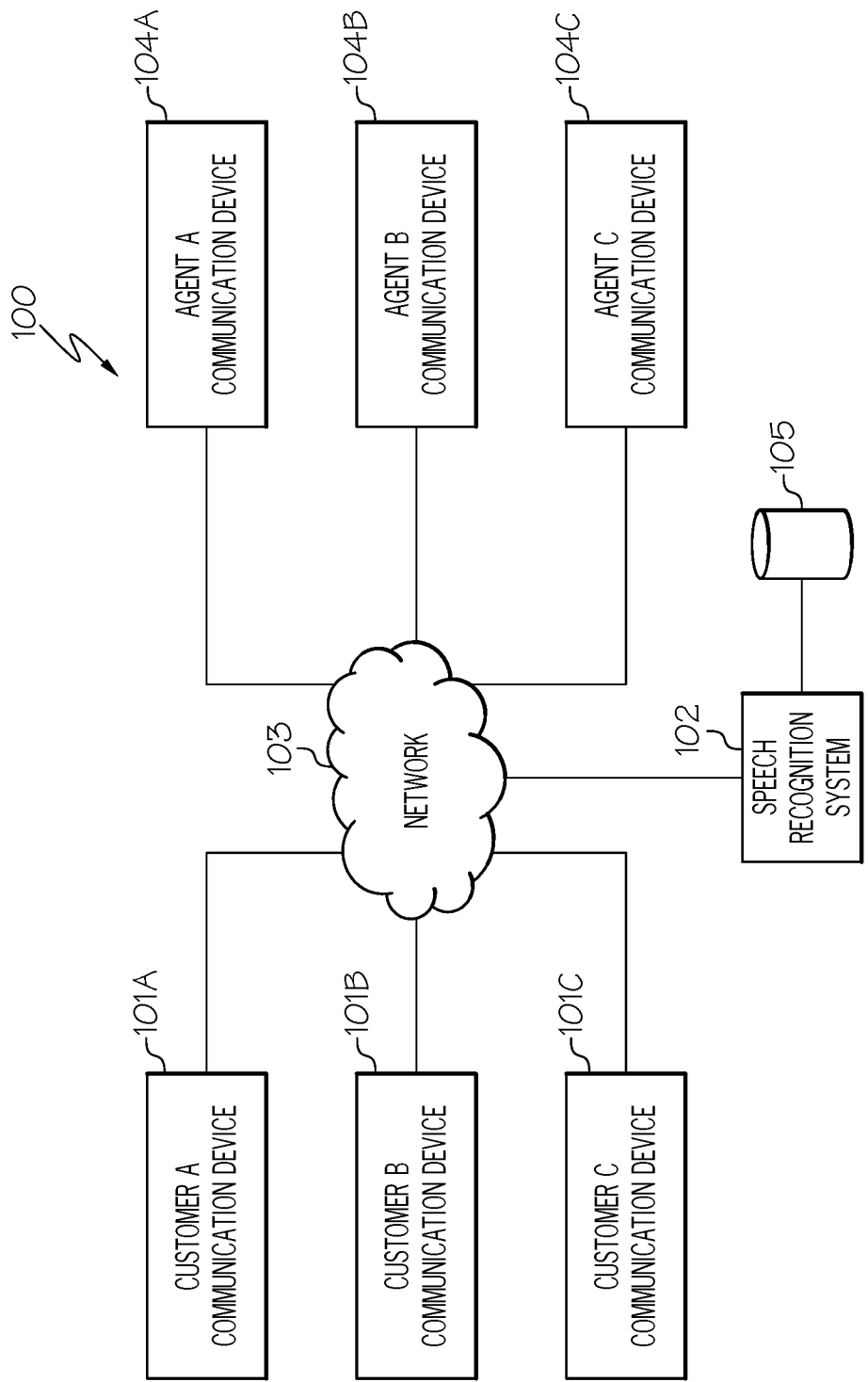
FIG. 1 illustrates a communication system for practicing the principles of the present disclosure in accordance with an embodiment of the present disclosure.

As stated in the Background section, speech recognition is an interdisciplinary subfield of computer science and computational linguistics that develops methodologies and technologies that enable the recognition and translation of spoken language into text by computers. It is also known as automatic speech recognition (ASR), computer speech recognition or speech-to-text (STT). It incorporates knowledge and research in the computer science, linguistics and computer engineering fields.

Speech recognition is used in various technological areas, especially in call centers, where speech recognition software is used to handle incoming customer calls to improve productivity, customer satisfaction and cut costs. By transforming audio (e.g., customer's spoken words) into text-based words, events or words spoken during the telephone call can be indexed and searched. This indexable, searchable content can be used for training new agents and establishing best practices.

However, the quality of such speech recognition performed by speech recognition systems may not be sufficient to accurately translate the spoken words into text.

The accuracy of speech recognition depends on various factors, such as the language vocabulary size of the speech-to-text model, confusability of the spoken words, inbound audio quality, background noise, speaker's dialect, etc. For example, in a call center situation, inbound calls are not received from a single particular customer. Instead, the inbound calls may be received from thousands of different customers with different dialects and different background environments (e.g., music in the background, children in the background).

Due to having customers, perhaps many thousands of customers, with different dialects and different background environments, a speech recognition system may need to pre-build thousands of speech-to-text models to translate speech into text to handle such scenarios. However, pre-building such a large number of speech-to-text models is not feasible due to cost.

Furthermore, it is not easy to identify the particular pre-trained speech-to-text model that would most accurately translate the spoken speech from a particular customer with a particular dialect and background environment into text.

As a result, current speech recognition systems fail to provide high quality speech recognition due to such challenges.

The embodiments of the present disclosure provide a means for providing high quality speech recognition via self-adaptive speech-to-text model reselection and continuous speech-to-text model self-training, tuning and customization.

In some embodiments of the present disclosure, the present disclosure comprises a computer-implemented method, system and computer program product for providing high quality speech recognition. In one embodiment of the present disclosure, an inbound call from a customer is detected. A speech-to-text model ("first speech-to-text model") is selected to perform speech recognition of the customer's spoken words and a speech-to-text model ("second speech-to-text model") is selected to perform speech recognition of the agent's spoken words. The combined results of the speech-to-text models used to process the customer's and agent's spoken words are then analyzed to generate a reference speech-to-text result. Such an analysis may involve obtaining word embeddings and feature embeddings which are used by an artificial neural network (e.g., recurrent neural network) to generate the "reference speech-to-text result" which more accurately transcribes the customer's spoken words than the first speech-to-text model. A confidence rate of the speech-to-text result of the first speech-to-text model is generated. The "confidence rate," as used herein, refers to the reliability of the speech recognition results. The customer speech data that was processed by the first speech-to-text model is cached and reprocessed by other speech-to-text models in response to the confidence rate of the speech-to-text result of the first speech-to-text model being unsatisfactory, such as being less than a threshold value. A similarity analysis is then performed on the results (textual output) of these speech-to-text models with respect to the reference speech-to-text result. Similarity scores are then assigned to each of these speech-to-text models based on such similarity analysis, where the greater in similarity between the output text of these speech-to-text models with respect to the reference speech-to-text result, the higher the value of the similarity score. The speech-to-text model with the highest similarity score is then selected as the new speech-to-text model for speech-to-text processing of the words spoken by the customer during the call. In this manner, the quality of the speech recognition is improved, such as via self-adaptive speech-to-text model reselection.

In the following description, numerous specific details are set forth to provide a thorough understanding of the present disclosure. However, it will be apparent to those skilled in the art that the present disclosure may be practiced without such specific details. In other instances, well-known circuits have been shown in block diagram form in order not to obscure the present disclosure in unnecessary detail. For the most part, details considering timing considerations and the like have been omitted inasmuch as such details are not necessary to obtain a complete understanding of the present disclosure and are within the skills of persons of ordinary skill in the relevant art.

Referring now to the Figures in detail, FIG. 1 illustrates a communication system 100 for practicing the principles of the present disclosure in accordance with an embodiment of the present disclosure. Communication system 100 includes communication devices 101A-101C (identified as "Customer A Communication Device," "Customer B Communication Device," and "Customer C Communication Device," respectively, in FIG. 1) connected to a speech recognition system 102 via a network 103. Communication devices 101A-101C may collectively or individually be referred to as communication devices 101 or communication device 101, respectively. It is noted that both communication devices 101 and the users of communication devices 101 (e.g., customers) may be identified with element number 101. A "customer," as used herein, refers to a user who initiates a telephone call on his/her communication device 101 to communicate with a call center (discussed further below).

Furthermore, as shown in FIG. 1, communication system 100 includes communication devices 104A-104C (identified as "Agent A Communication Device," "Agent B Communication Device," and "Agent C Communication Device," respectively, in FIG. 1) connected to speech recognition system 102 via network 103. Communication devices 104A-104C may collectively or individually be referred to as communication devices 104 or communication device 104, respectively. It is noted that both communication devices 104 and the users of communication devices 104 (e.g., agents) may be identified with element number 104. An "agent," as used herein, refers to a user who handles calls for a business and speaks with a customer regarding a service or product. In one example, the agent is attempting to complete a transaction involving a service or product with the customer, who may be a prospective customer. In another example, the agent may be answering questions from a customer regarding a previously purchased service or product.

Communication devices 101, 104 may be any telephonic device, such as a telephone, a cellular phone, a satellite phone, a portable computing unit, a Personal Digital Assistant (PDA), a mobile phone and the like configured with the capability for performing communications, such as between the communication device 101, 104 and a call center (discussed further below) and between the communication devices 101, 104. Communication device 101, 104 may have various inputs/outputs with which the user (caller) may interact to provide and receive audio, text, video, and other forms of data.

Network 103 may include a circuit-switched voice or data network, a packet-switched voice or data network, or any other network able to carry voice and/or data, for example, Internet Protocol (IP)-based or asynchronous transfer mode (ATM)-based networks, including wired or wireless networks. Network 103 may be configured to handle voice traffic, for example, Voice over IP (VOIP) network. Network 103 also may be configured to handle web traffic, such as hypertext transfer protocol (HTTP) traffic and hypertext markup language (HTML) traffic. Network 103 may also include the Internet, Wide Area Networks (WANs), Local Area Networks (LANs), analog or digital wired and wireless networks (e.g., IEEE 802.11 networks, Public Switched Telephone Network (PSTN), Integrated Services Digital Network (ISDN), and Digital Subscriber Line (xDSL)), Third Generation (3G), Fourth Generation (4G) or Fifth Generation (5G) mobile telecommunication networks, a wired Ethernet network, a private network, such as an Intranet, radio, television, cable, satellite, and/or any other delivery or tunneling mechanism for carrying data, or any appropriate combination of such networks.

In one embodiment, speech recognition system 102 may reside within a call center, such as a centralized office used for transmitting a large volume of enquiries by telephone via network 103. In such a scenario, speech recognition system 102 may be configured to direct a call received from a customer (e.g., customer A) of communication device 101 (e.g., communication device 101A) to a particular agent (e.g., agent A) of communication device 104 (e.g., communication device 104A) to assist the customer. In one embodiment, speech recognition system 102 is configured to translate speech-to-text in a manner that provides high quality speech recognition via self-adaptive speech-to-text model reselection and continuous speech-to-text model self-training, tuning and customization as discussed further below. A description of the software components of speech recognition system 102 used to provide high quality speech recognition is provided below in connection with FIG. 2 and a description of the hardware configuration of speech recognition system 102 is provided further below in connection with FIG. 3.

Furthermore, as shown in FIG. 1, speech recognition system 102 is connected to a database 105 configured to store profiles of customers 101, including prospective customers, that includes information, such as name, telephone number, cached customer speech data (discussed further below), cached agent speech data (discussed further below), a speech-to-text model utilized (discussed further below), etc. Furthermore, in one embodiment, database 105 stores profiles of agents 104, that includes information, such as name, telephone number, cached agent speech data (discussed further below), a pre-trained speech-to-text model to be used for the agent (discussed further below), etc. Additionally, in one embodiment, database 105 stores data structures, such as tables, which store keywords, where such keywords are associated with a subject, such as a subject (e.g., product A) of a call that took place. Furthermore, in one embodiment, database 105 stores data structures, such as tables, that include a list of information (e.g., operating system of the computing device) that should be gathered for particular subjects (e.g., prerequisites of version #2 for product A).

System 100 is not to be limited in scope to any one particular network architecture. System 100 may include any number of communication devices 101, 104, speech recognition systems 102, networks 103 and databases 105.

A discussion regarding the software components used by speech recognition system 102 to provide high quality speech recognition is discussed below in connection with FIG. 2.

Figure 2:
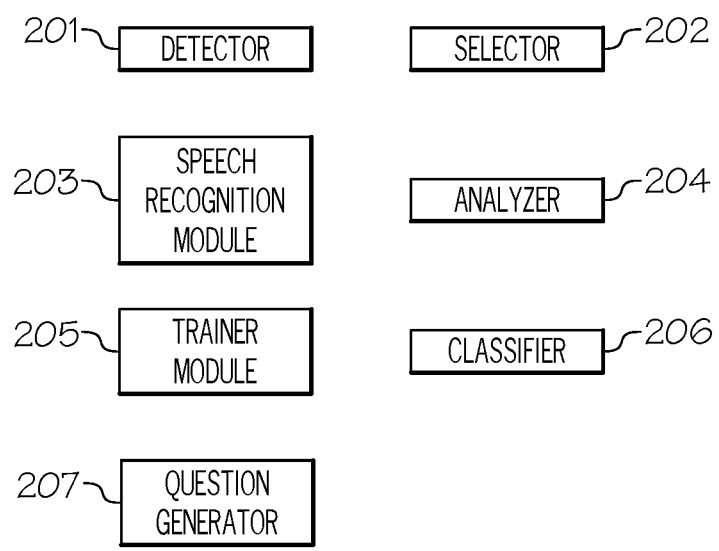
FIG. 2 is a diagram of the software components of the speech recognition system used to provide high quality speech recognition in accordance with an embodiment of the present disclosure.

FIG. 2 is a diagram of the software components of speech recognition system 102 (FIG. 1) used to provide high quality speech recognition in accordance with an embodiment of the present disclosure.

Referring to FIG. 2, in conjunction with FIG. 1, speech recognition system 102 includes a detector 201 configured to detect an inbound call from a customer 101. In one embodiment, detector 201 is configured to detect an inbound call from a customer 101 by detecting a telecommunication signal, such as a ringing tone, that alerts a telephone subscriber (e.g., subscriber in the call center) to an incoming telephone call. In one embodiment, detector 201 is configured to detect the caller's registered phone number, which is provided by the originating phone switch which sends the caller's registered phone number. In another embodiment, such information (caller's registered phone number) is available from the Voice over Internet Protocol (VoIP) services. In one embodiment, detector 201 utilizes CNAM (Calling-NAMe, which correspond to third-party services that carriers use to identify the name of inbound callers) to cross-reference the phone number with the appropriate contact name (i.e., the name of the caller). In another embodiment, the name of the caller is identified based on the caller's identified SIP (Session Initiation Protocol) account. In one embodiment, such information (e.g., telephone number, name of caller/customer) is stored in profiles of customers 101, including prospective customers, which are stored in database 105. In one embodiment, such customer profiles store information, such as name, telephone number, cached customer speech data (discussed further below), cached agent speech data (discussed further below), a speech-to-text model utilized during the call (discussed further below), etc. In one embodiment, such information (e.g., name of customer 101, telephone number used by customer 101 to make inbound call) is acquired by detector 201 using inbound call tracking software, such as CallRail®, Invoca®, DialogTech®, RingDNA®, etc.

Furthermore, in one embodiment, detector 201 determines the geographical location (e.g., state of Texas in the United States of America) of the inbound calls, such as the geographical location based on the telephone number. For example, various tracking software programs may be utilized to determine the geographical location of the inbound calls, such as DialogTech®. Such information may be stored in the appropriate customer profile in database 105, such as the customer who originated such a call.

Speech recognition system 102 further includes a selector 202 configured to select a particular speech-to-text model to perform the speech recognition of the customer's spoken words. In one embodiment, such a selection is based on the geographical location of the inbound call number. As previously discussed, such geographical location information is acquired from detector 201, which may be stored in a customer profile in database 105, such as in the customer profile of customer 101 who initiated the phone call. For example, selector 202 would select a speech-to-text model to handle calls made from the state of Texas in the United States of America and another speech-to-text model to handle calls made from the country of Canada.

In another embodiment, selector 202 selects the particular speech-to-text model based on the speech-to-text model previously utilized by customer 101 in scenarios in which the inbound call is made from a repeat customer 101 who already has a profile previously created by speech recognition system 102. In such a scenario, the profile may include the speech-to-text model previously utilized during the phone call with the call center. Such a model may be identified and selected by selector 202 by performing a look-up in database 105 for the profile associated with the inbound telephone number or name of the caller, and then identifying the speech-to-text model listed in such a profile. In one embodiment, the profile contains the speech-to-text model that was previously identified as having the highest speech recognition quality.

In one embodiment, selector 202 selects a pre-trained speech-to-text model to perform speech recognition of an assigned agent's spoken words. In one embodiment, selector 202 is configured to assign an agent 104 to a customer 101. In one embodiment, such a selection is based on randomly selecting available agents 104 to handle the call from customer 101. In one embodiment, each agent has a profile that includes information about the agent, such as name, telephone number, a pre-trained speech-to-text model that performs the highest quality speech recognition, etc. In one embodiment, the speech-to-text model listed in the agent's profile is a baseline speech-to-text model that was trained using datasets, including audio data, provided by the agent. In one embodiment, such training is performed via speech customization software, such as Microsoft® Speech Studio, IBM Watson® Speech-to-Text, etc.

In one embodiment, audio files from agent 104 are collected and then transcribed by a human transcriber. Those audio files will then be translated into text by a baseline speech-to-text model. The accuracy of such a translation may then be determined by a translation expert. The translation expert may then adapt/customize the model to more closely match the transcription performed by the human transcriber, such as enhancing the existing baseline speech-to-text model with domain-specific terminology, acronyms, jargon, expressions, etc. In one embodiment, such customization may be performed using IBM Watson® Speech-to-Text.

In one embodiment, the pre-trained speech-to-text model to perform speech recognition of the agent's spoken words selected by selector 202 is based on a baseline speech-to-text model that is pre-trained with general words and terms commonly used by agents 104. Such a pre-trained model may apply to any of the agents 104 that are requested to assist customer 101. In one embodiment, such pre-training is performed using IBM Watson® Speech-to-Text.

In one embodiment, selector 202 selects the speech-to-text model with the highest similarity score as the new speech-to-text model for speech-to-text processing of the customer's spoken words during the ongoing call. In one embodiment, if the confidence rate of the speech-to-text processing of the customer's spoken words performed by the selected speech-to-text model is not satisfactory, such as not exceeding a threshold value, then the customer's speech data, which has been cached, is reprocessed by multiple speech-to-text models to perform speech recognition of the customer's spoken words. As will be discussed in further detail below, the confidence rate refers to the reliability of the speech recognition results. Furthermore, as will be discussed in greater detail below, a similarity analysis of the results of these speech-to-text models is performed with reference to a "reference speech-to-text result," which more accurately transcribes the customer's spoken words than the original speech-to-text model selected to perform speech recognition of the customer's spoken words. The reference speech-to-text result, as used herein, refers to an analyzed combination of the results of the speech-to-text models used to process the customer's and agent's spoken words as discussed in further detail below. After performing the similarity analysis, a similarity score will be assigned to each of these speech-to-text models based on the similarity analysis as discussed in further detailed below. Selector 102 will then select the speech-to-text model with the highest similarity score as the new speech-to-text model for speech-to-text processing of the customer's spoken words during the ongoing call thereby improving the speech recognition quality during the ongoing call since a better speech-to-text model will be used to translate the customer's spoken words.

Furthermore, speech recognition system 102 includes a speech recognition module 203 configured to perform speech recognition involving the translation of speech-to-text using a speech-to-text model. Various speech-to-text models may be used, such as, for example, IBM Watson® Speech-to-Text, Verbit, Speechmatics®, Braina Pro, Amazon® Transcribe, Microsoft® Azure Speech-to-Text, etc.

In one embodiment, speech recognition module 203 caches the customer's spoken words as customer speech data, such as in a cache of speech recognition system 102. In one embodiment, such spoken words are recorded and then stored in a cache, such as a cache located within or externally to the processor of speech recognition system 102. In one embodiment, such recordation is performed by voice recording software, such as Audacity®, Adobe® Audition, Wavepad, Mixcraft® 9, Recordpad, etc.

In one embodiment, speech recognition module 203 caches the agent's spoken words as agent speech data, such as in a cache of speech recognition system 102. In one embodiment, such spoken words are recorded and then stored in a cache, such as a cache located within or externally to the processor of speech recognition system 102. In one embodiment, such recordation is performed by voice recording software, such as Audacity®, Adobe® Audition, Wavepad, Mixcraft® 9, Recordpad, etc.

In one embodiment, speech recognition module 203 is configured to generate a confidence rate of the speech-to-text result performed by the speech-to-text model used to perform speech recognition of the customer's spoken words. As used herein, the confidence rate refers to the reliability of the speech recognition results.

In one embodiment, the confidence rate is provided by the speech-to-text model, such as IBM Watson® Speech-to-Text. In one embodiment, the confidence rate corresponds to a value that is normalized between the values of 0 and 1.

In one embodiment, the confidence rate is determined using the reference speech-to-text result in which the output of the speech-to-text model used to perform speech recognition of the customer's spoken words is compared against the reference speech-to-text result. A word error rate may then be calculated based on the reference speech-to-text result, which corresponds to the number of substitutions, the number of deletions plus the number of insertions that need to be made in the output of the speech-to-text model used to perform speech recognition of the customer's spoken words to make it equivalent to the reference speech-to-text result, which is all divided by the number of words in the output of the speech-to-text model used to perform speech recognition of the customer's spoken words. The word error rate may then correspond to the confidence rate, which is normalized between a value of 0 and 1.

In one embodiment, the confidence rate is determined using a word confusion network for confidence modeling.

In one embodiment, the confidence rate is determined using a heterogeneous word confusion network involving a representation of multiple word confusion networks for a given utterance. In such an embodiment, a bidirectional lattice recurrent network is trained to obtain confidence values for every arc in the heterogeneous word confusion network.

In one embodiment, the confidence rate is computed as scores at the phonetic, word and utterance level. The scores are produced by extracting confidence features from the computation of the recognition hypotheses and processing these features using an accept/reject classifier for word and utterance hypotheses.

Speech recognition system 102 further includes an analyzer 204 configured to analyze the combination of the results of the speech-to-text models used to process the customer's and agent's spoken words. As previously discussed, such an analyzed combination is referred to herein as the "reference speech-to-text result."

In one embodiment, analyzer 204 obtains the word embeddings from the output (text) generated by the speech-to-text model used to transcribe the customer's spoken words. A "word embedding," as used herein, is a presentation of words for text analysis, such as in a form of a real-valued vector that encodes the meaning of the word, such that the words that are closer in the vector space are expected to be similar in meaning. In one embodiment, such word embeddings are obtained using Word2vec. In one embodiment, Word2vec produces a vector space, typically of several hundred dimensions, from the inputted text (output of speech-to-text model used to transcribe the customer's spoken words), where each unique word is assigned a corresponding vector in the space. Word vectors are positioned in the vector space such that words that share common contexts in the corpus are located close to one another in the space.

Other methods for obtaining word embeddings by analyzer 204 from the output (text) generated by the speech-to-text model used to transcribe the customer's spoken words include binary encoding, term frequency encoding, term frequency-inverse document frequency encoding, latent semantic analysis encoding, etc.

In one embodiment, analyzer 204 performs contextual feature extraction (feature embeddings) of the output (text) generated by the speech-to-text model used to transcribe the agent's spoken words, such as using a Bidirectional Encoder Representations from Transformers (BERT) model. Using this bidirectional capability, BERT is pre-trained on two different, but related, natural language processing (NLP) tasks: masked language modeling and next sentence prediction. In one embodiment, such contextual features or feature embeddings refer to a feature representation where certain properties can be represented by notions of distance, such as a vector of numbers. In one embodiment, the BERT model produces feature embeddings that are dynamically informed by the words around them.

For example, in one embodiment, the input data (output (text) generated by the speech-to-text model used to transcribe the agent's spoken words) is modified to be in a specific format, with special tokens to mark the beginning and separation/end of sentences. Furthermore, the text is tokenized into tokens that correspond to BERT's vocabulary. For each tokenized sentence, BERT requires input identifiers, a sequence of integers identifying each input token to its index number in the BERT tokenizer vocabulary.

In one embodiment, the feature embeddings are obtained from the BERT model by summing a particular number of layers of transformer encoders, such as the last four layers of transformer encoders, where each output per token from each layer can be used as a feature embedding.

Such word embeddings and contextual features, as discussed above, are used by analyzer 204 to generate the "reference speech-to-text result" using an artificial neural network (e.g., recurrent neural network). A recurrent neural network (RNN), as used herein, is a type of artificial neural network which uses sequential data or time series data. In the RNN, connections between nodes form a directed graph along a temporal sequence which allows it to exhibit temporal dynamic behavior. Furthermore, recurrent neural networks can use their internal state (memory) to process sequences of inputs. By utilizing such a network, a more accurate translation of the customer's spoken words may result as discussed further below.

For example, a recurrent neural network, such as the long short term memory (LSTM) recurrent neural network or the gated recurrent units (GRU) recurrent neural network, is used to generate a more accurate translation of the customer's spoken words based on the recurrent neural network predicting the probability of the next word in the sequence based on the words already observed in the sequence. In one embodiment, the recurrent neural network uses a distributed representation where different words with similar meanings have similar representation and uses a large context of recently observed words when making predictions (predicting the next word in sequence).

Furthermore, in one embodiment, analyzer 204 performs similarity analysis of the results of the speech-to-text models with respect to the reference speech-to-text result. As discussed above, if the confidence rate of the speech-to-text processing of the customer's spoken words performed by the selected speech-to-text model is not satisfactory, such as not exceeding a threshold value, then the customer's speech data, which has been cached, is reprocessed by multiple speech-to-text models to perform speech recognition of the customer's spoken words. The results of such speech recognition performed by such speech-to-text models is compared against the reference speech-to-text result.

In one embodiment, such a similarity analysis involves semantic similarity. In such an embodiment, the output text of the speech-to-text model and the reference speech-to-text result are converted into real-valued vectors, such as using word counts. In another embodiment, a neural net (e.g., two-layer neural net) may be used to vectorize the words, such as Word2vec. Once the output text of the speech-to-text model and the reference speech-to-text result are converted into real-valued vectors, a similarity measure, such as cosine similarity, may be used to determine the similarity between the two texts. Such a measure will result in a score (similarity score) between the values of 0 and 1 for vectors that have only positive values. In one embodiment, any negative scores can be made positive by taking its absolute value.

Speech recognition system 102 further includes a trainer module 205 configured to train speech-to-text models, such as those that are related to the initial speech-to-text model that performed speech recognition of the customer's spoken words. Such training may occur in response to the confidence rate (discussed above) not being above a threshold value (including the scenario of being equal to the threshold value), which may be user-selected. In one embodiment, such related speech-to-text models may correspond to those speech-to-text models that are targeted to perform speech recognition for the same geographical location (e.g., state of Texas in the United States of America).

In one embodiment, such speech-to-text models are trained by trainer module 205 inputting the customer and/or agent cached speech data to the speech-to-text models, and then having the speech-to-text models compare their outputted text with the reference speech-to-text result. By performing speech recognition on the customer and/or agent cached speech data and then comparing the outputted text with the reference speech-to-text result, such models (e.g., IBM Watson® Speech-to-Text) may identify such discrepancies and learn from such discrepancies. In one embodiment, such discrepancies correspond to corrections in the transcription, which may be stored in a file and used by the model (e.g., IBM Watson® Speech-to-Text) to improve its accuracy.

In one embodiment, after the call is completed between customer 101 and agent 104, trainer module 205 may train speech-to-text models, such as those that are related to the initial speech-to-text model that performed speech recognition of the customer's spoken words, in the manner discussed above.

Additionally, speech recognition system 102 includes a classifier 206 configured to classify the subject of the call based on an analysis of the customer and agent cached speech data, such as when the confidence rate of the speech-to-text result performed by the initial speech-to-text model on the customer's spoken words is not above a threshold value (including the scenario of being equal to the threshold value), which may be user-selected.

In one embodiment, classifier 206 classifies the subject of the call based on identifying keywords in the text (translation of words spoken by customer 101). Such keywords are identified in data structures, such as a table, which are stored in database 105. Each keyword may be associated with a subject in the data structure. Based on matching one or more keywords in the data structure, one or more subjects (e.g., product A) of the call may be identified. In one embodiment, such a data structure is stored in a storage device (e.g., memory, disk drive) of speech recognition system 102. In one embodiment, such a data structure is stored in database 105.

In one embodiment, each subject is associated with a data structure (e.g., table) that includes a list of information that should be gathered during the phone call between customer 101 and agent 104. For example, if the subject pertained to the prerequisites of version #2 for product A, then certain information, such as the operating system of the computing device, should be gathered. In such an example, the subject of prerequisites of version #2 for product A may be associated with a data structure storing various information, such as the operating system of the computing device, that should be gathered. In one embodiment, such a data structure is stored in a storage device (e.g., memory, disk drive) of speech recognition system 102. In one embodiment, such a data structure is stored in database 105.

In one embodiment, classifier 206 analyzes the customer and agent cached data to determine if any information that should have been gathered was not gathered. In one embodiment, such an analysis is performed by classifier 206 using natural language processing in which keywords are searched in the customer and agent cached data based on the information that should be gathered for the identified subject(s) of the call. For example, if the subject of the prerequisites of version #2 for product A is associated with a data structure (e.g., table) that includes information that should be gathered, such as the operating system of the computing device used by customer 101, then classifier 206 searches for the keyword terms of "operating system" in the customer and agent cached data to determine if such information was gathered. If such information is not identified, then such information is deemed to be missing.

Furthermore, speech recognition system 102 includes a question generator 207 configured to generate questions for agent 104 to ask customer 101 to acquire the missing information (discussed above). In one embodiment, each information (e.g., operating system of the computing device) that needs to be acquired during the phone call pertaining to a subject of the call is associated with one or more questions to acquire such information. In one embodiment, such questions are stored in a data structure (e.g., table). In one embodiment, such a data structure is stored in a storage device (e.g., memory, disk drive) of speech recognition system 102. In one embodiment, such a data structure is stored in database 105.

For example, if classifier 206 determined that the information pertaining to the operating system of the computing device used by customer 101 was missing, then such information may be associated with a data structure (e.g., table) that stores question(s) to be asked to customer 101 to acquire such information. For example, the question of "What is the operating system of your computing device? (a) Microsoft® Windows, (b) macOS®, (c) Linux®, (d) Android®, (e) iOS®" may be associated with the information pertaining to the operating system of the computing device used by customer 101. Such information may be acquired from the pertinent data structure by question generator 207.

In one embodiment, such questions are easy-to-answer questions in which customer 101 can answer such questions in simple words/sentences. In one embodiment, such questions are easy-to-answer multiple choice questions. In one embodiment, such questions are easy-to-answer questions that are designed to increase the accuracy of the translation thereby producing a higher quality speech-to-text result.

A further description of these and other functions is provided below in connection with the discussion of the method for providing high quality speech recognition.

Prior to the discussion of the method for providing high quality speech recognition, a description of the hardware configuration of speech recognition system 102 (FIG. 1) is provided below in connection with FIG. 3.

Figure 3:
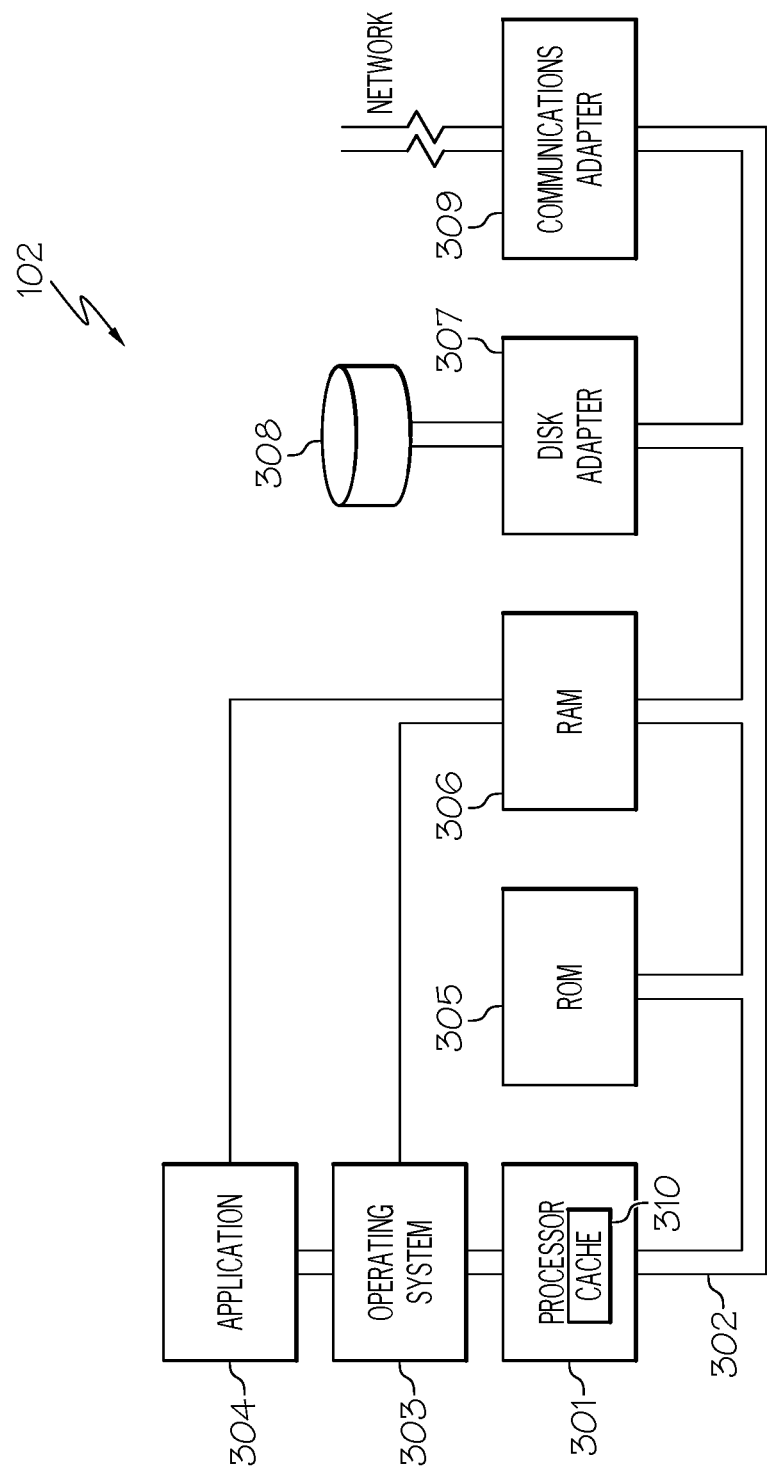
FIG. 3 illustrates an embodiment of the present disclosure of the hardware configuration of the speech recognition system which is representative of a hardware environment for practicing the present disclosure.

Referring now to FIG. 3, FIG. 3 illustrates an embodiment of the present disclosure of the hardware configuration of speech recognition system 102 (FIG. 1) which is representative of a hardware environment for practicing the present disclosure.

Speech recognition system 102 has a processor 301 connected to various other components by system bus 302. An operating system 303 runs on processor 301 and provides control and coordinates the functions of the various components of FIG. 3. An application 304 in accordance with the principles of the present disclosure runs in conjunction with operating system 303 and provides calls to operating system 303 where the calls implement the various functions or services to be performed by application 304. Application 304 may include, for example, detector 201 (FIG. 2), selector 202 (FIG. 2), speech recognition module 203 (FIG. 2), analyzer 204 (FIG. 2), trainer module 205 (FIG. 2), classifier 206 (FIG. 2) and question generator 207 (FIG. 2). Furthermore, application 304 may include, for example, a program for providing high quality speech recognition as discussed further below in connection with FIGS. 4A-4C and 5-6.

Referring again to FIG. 3, read-only memory ("ROM") 305 is connected to system bus 302 and includes a basic input/output system ("BIOS") that controls certain basic functions of speech recognition system 102. Random access memory ("RAM") 306 and disk adapter 307 are also connected to system bus 302. It should be noted that software components including operating system 303 and application 304 may be loaded into RAM 306, which may be speech recognition system's 102 main memory for execution. Disk adapter 307 may be an integrated drive electronics ("IDE") adapter that communicates with a disk unit 308, e.g., disk drive. It is noted that the program for providing high quality speech recognition, as discussed further below in connection with FIGS. 4A-4C and 5-6, may reside in disk unit 308 or in application 304.

Speech recognition system 102 may further include a communications adapter 309 connected to bus 302. Communications adapter 309 interconnects bus 302 with an outside network (e.g., network 103 of FIG. 1) to communicate with other devices, such as communication devices 101, 104 of FIG. 1.

Furthermore, in one embodiment, speech recognition system 102 includes a cache 310 located within processor 301.

In one embodiment, cache 310 is located externally of processor 301. In one embodiment, cache 310 is configured to store the customer speech data and the agent speech data.

In one embodiment, application 304 of speech recognition system 102 includes the software components of detector 201, selector 202, speech recognition module 203, analyzer 204, trainer module 205, classifier 206 and question generator 207. In one embodiment, such components may be implemented in hardware, where such hardware components would be connected to bus 302. The functions discussed above performed by such components are not generic computer functions. As a result, speech recognition system 102 is a particular machine that is the result of implementing specific, non-generic computer functions.

In one embodiment, the functionality of such software components (e.g., detector 201, selector 202, speech recognition module 203, analyzer 204, trainer module 205, classifier 206 and question generator 207) of speech recognition system 102, including the functionality for providing high quality speech recognition, may be embodied in an application specific integrated circuit.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated above, speech recognition is used in various technological areas, especially in call centers, where speech recognition software is used to handle incoming customer calls to improve productivity, customer satisfaction and cut costs. By transforming audio (e.g., customer's spoken words) into text-based words, events or words spoken during the telephone call can be indexed and searched. This indexable, searchable content can be used for training new agents and establishing best practices. However, the quality of such speech recognition performed by speech recognition systems may not be sufficient to accurately translate the spoken words into text. The accuracy of speech recognition depends on various factors, such as the language vocabulary size of the speech-to-text model, confusability of the spoken words, inbound audio quality, background noise, speaker's dialect, etc. For example, in a call center situation, inbound calls are not received from a single particular customer. Instead, the inbound calls may be received from thousands of different customers with different dialects and different background environments (e.g., music in the background, children in the background). Due to having customers, perhaps many thousands of customers, with different dialects and different background environments, a speech recognition system may need to pre-build thousands of speech-to-text models to translate speech into text to handle such scenarios. However, pre-building such a large number of speech-to-text models is not feasible due to cost. Furthermore, it is not easy to identify the particular pre-trained speech-to-text model that would most accurately translate the spoken speech from a particular customer with a particular dialect and background environment into text. As a result, current speech recognition systems fail to provide high quality speech recognition due to such challenges.

Figure 4A:
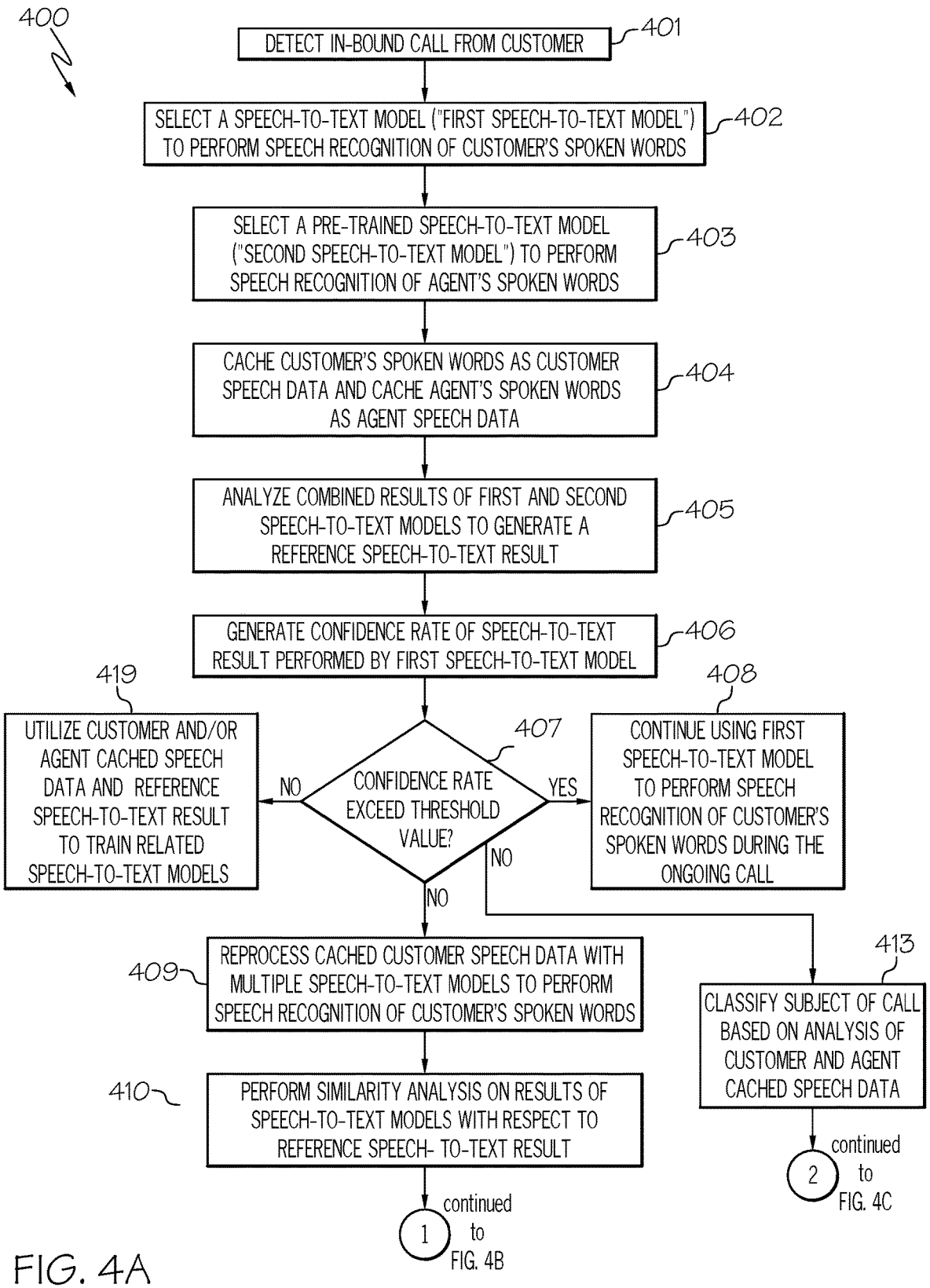
FIGS. 4A-4C are a flowchart of a method for providing high quality speech recognition in accordance with an embodiment of the present disclosure.
Figure 4B:
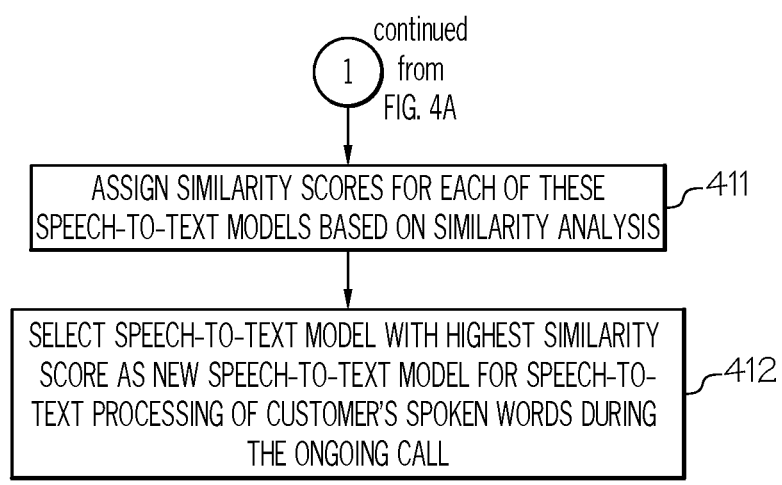
Figure 4C:
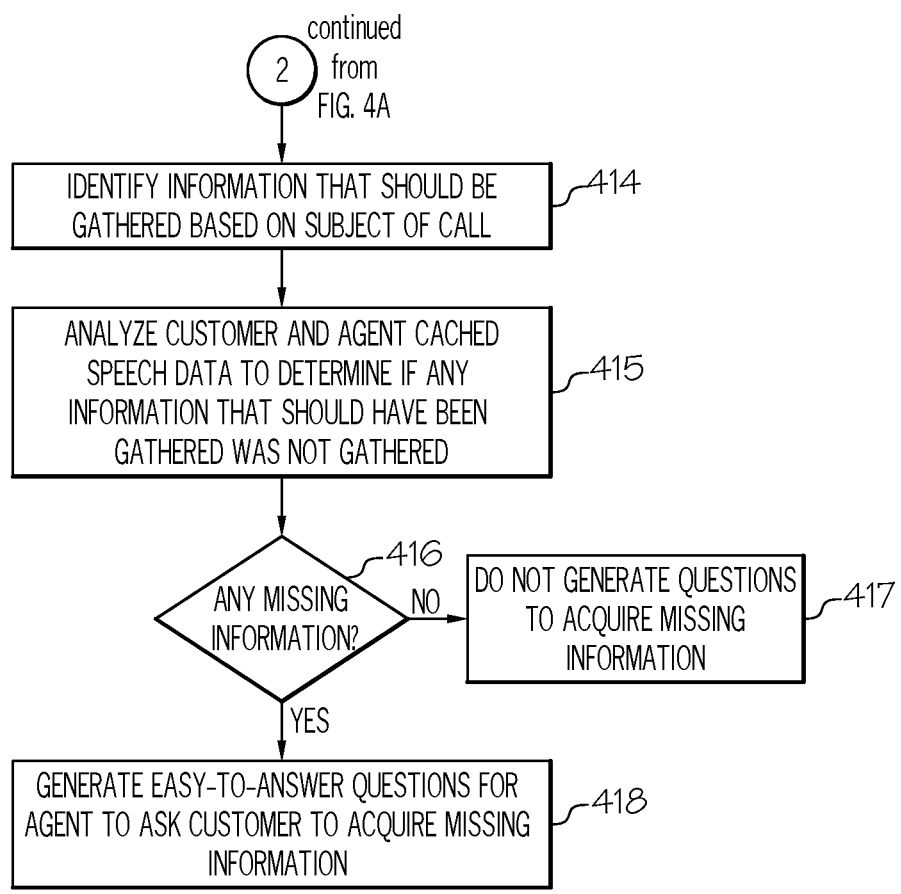
Figure 5:
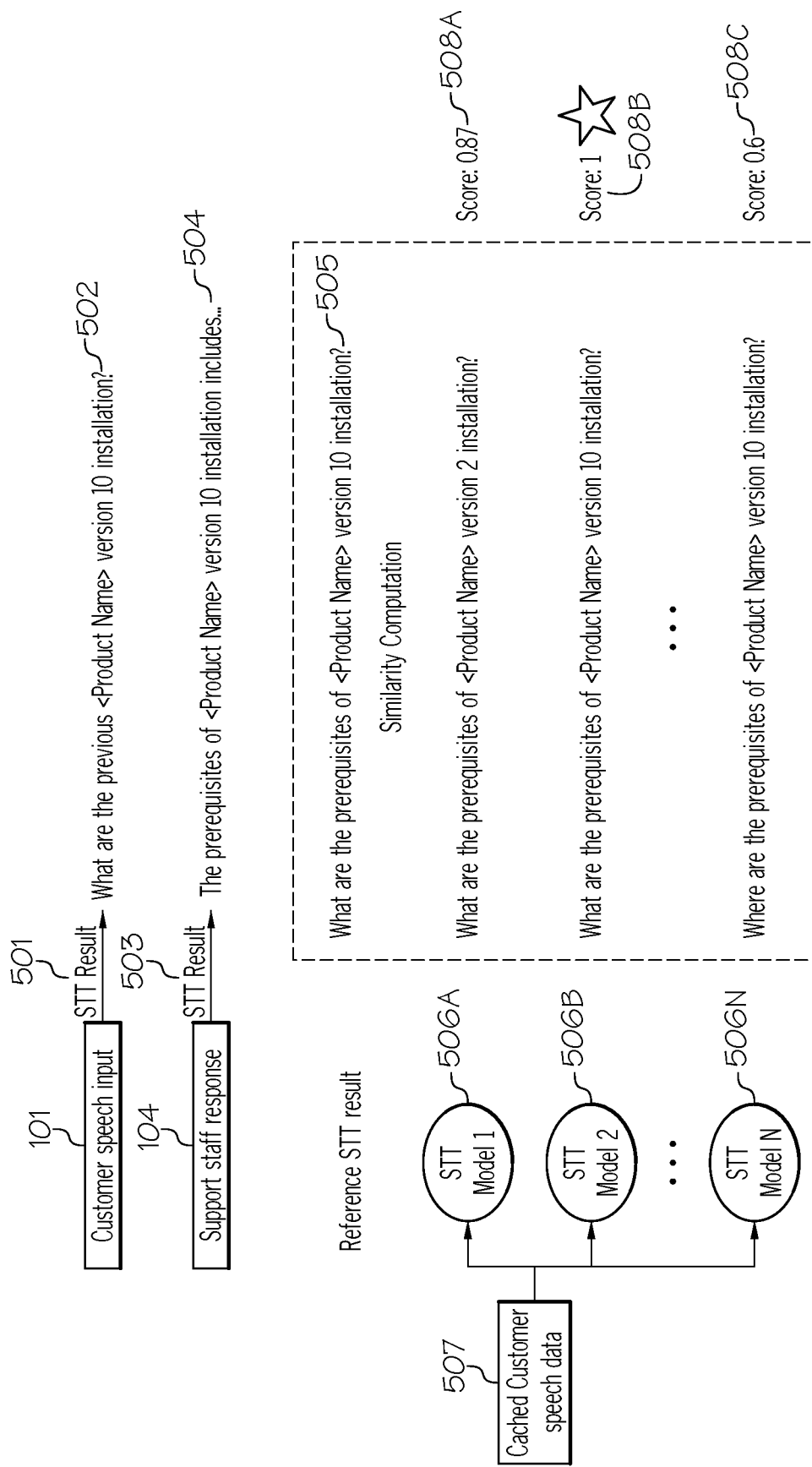
FIG. 5 illustrates an example of performing similarity analysis on the results of the speech-to-text models performing speech recognition of the customer's spoken words with respect to the reference speech-to-text result in accordance with an embodiment of the present disclosure.
Figure 6:
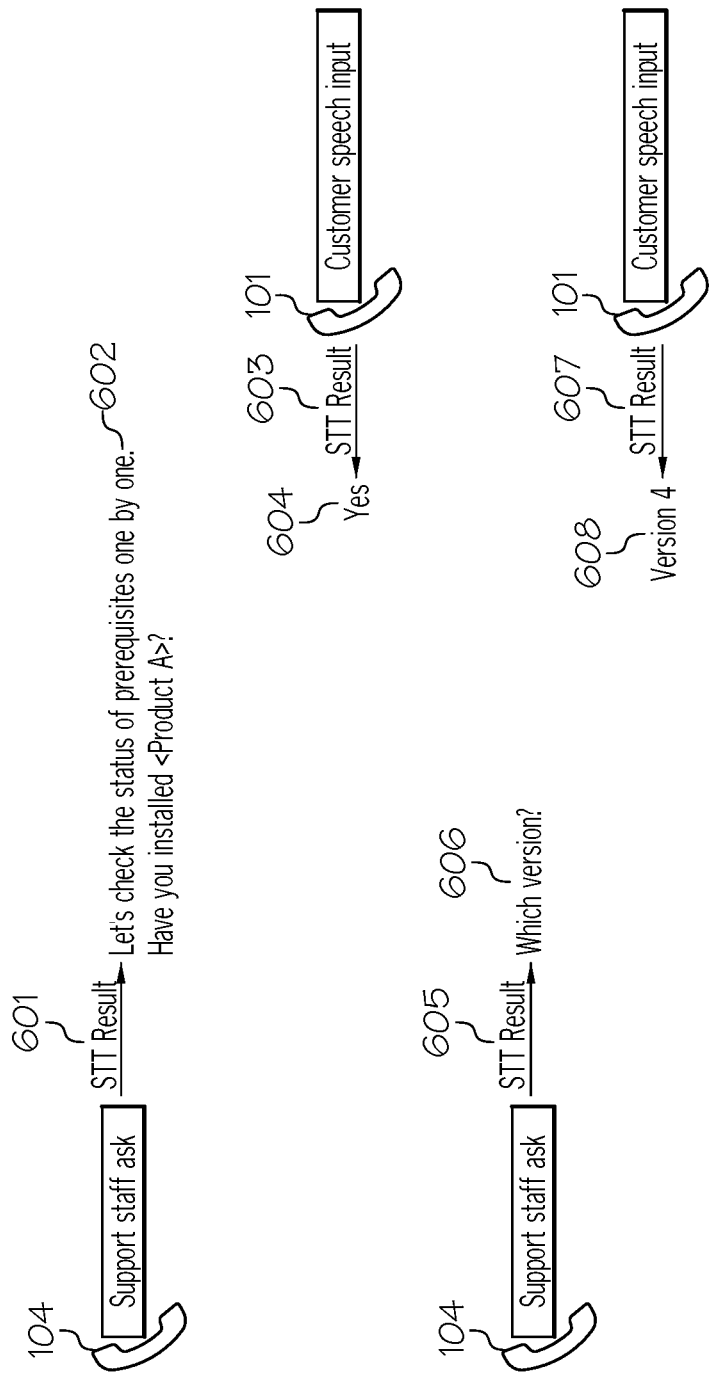
FIG. 6 illustrates an example of easy-to-answer questions that are generated for the agent to ask the customer in order to acquire missing information in accordance with an embodiment of the present disclosure.

The embodiments of the present disclosure provide a means for providing high quality speech recognition via self-adaptive speech-to-text model reselection and continuous speech-to-text model self-training, tuning and customization as discussed below in connection with FIGS. 4A-4C and 5-6. FIGS. 4A-4C are a flowchart of a method for providing high quality speech recognition. FIG. 5 illustrates an example of performing similarity analysis on the results of the speech-to-text models performing speech recognition of the customer's spoken words with respect to the reference speech-to-text result. FIG. 6 illustrates an example of easy-to-answer questions that are generated for the agent to ask the customer in order to acquire missing information.

As stated above, FIGS. 4A-4C are a flowchart of a method 400 for providing high quality speech recognition in accordance with an embodiment of the present disclosure.

Referring to FIG. 4A, in conjunction with FIGS. 1-3, in step 401, detector 201 of speech recognition system 102 detects an inbound call from a customer (e.g., customer A of communication device 101A).

As discussed above, in one embodiment, detector 201 is configured to detect an inbound call from a customer 101 by detecting a telecommunication signal, such as a ringing tone, that alerts a telephone subscriber (e.g., subscriber in the call center) to an incoming telephone call. In one embodiment, detector 201 is configured to detect the caller's registered phone number, which is provided by the originating phone switch which sends the caller's registered phone number. In another embodiment, such information (caller's registered phone number) is available from the Voice over Internet Protocol (VoIP) services. In one embodiment, detector 201 utilizes CNAM (CallingNAMe, which correspond to third-party services that carriers use to identify the name of inbound callers) to cross-reference the phone number with the appropriate contact name (i.e., the name of the caller). In another embodiment, the name of the caller is identified based on the caller's identified SIP (Session Initiation Protocol) account. In one embodiment, such information (e.g., telephone number, name of caller/customer) is stored in profiles of customers 101, including prospective customers, which are stored in database 105. In one embodiment, such customer profiles store information, such as name, telephone number, cached customer speech data (discussed further below), cached agent speech data (discussed further below), a speech-to-text model utilized during call (discussed further below), etc. In one embodiment, such information (e.g., name of customer 101, telephone number used by customer 101 to make inbound call) is acquired by detector 201 using inbound call tracking software, such as CallRail®, Invoca®, DialogTech®, RingDNA®, etc.

Furthermore, in one embodiment, detector 201 determines the geographical location (e.g., state of Texas in the United States of America) of the inbound calls, such as the geographical location based on the telephone number. For example, various tracking software programs may be utilized to determine the geographical location of the inbound calls, such as DialogTech®. Such information may be stored in the appropriate customer profile in database 105, such as the customer who originated such a call.

In step 402, selector 202 of speech recognition system 102 selects a speech-to-text model ("first speech-to-text model") to perform the speech recognition of the customer's spoken words.

As discussed above, in one embodiment, such a selection is based on the geographical location of the inbound call number. As previously discussed, such geographical location information is acquired from detector 201, which may be stored in a customer profile in database 105, such as in the customer profile of customer 101 who initiated the phone call. For example, selector 202 would select a speech-to-text model to handle calls made from the state of Texas in the United States of America and another speech-to-text model to handle calls made from the country of Canada.

In another embodiment, selector 202 selects the particular speech-to-text model based on the speech-to-text model previously utilized by customer 101 in scenarios in which the inbound call is made from a repeat customer 101 who already has a profile previously created by speech recognition system 102. In such a scenario, the profile may include the speech-to-text model previously utilized during the phone call with the call center. Such a model may be identified and selected by selector 202 by performing a look-up in database 105 for the profile associated with the inbound telephone number or name of the caller, and then identifying the speech-to-text model listed in such a profile.

In one embodiment, the profile contains the speech-to-text model that was previously identified as having the highest speech recognition quality.

In step 403, selector 202 of speech recognition system 101 selects a pre-trained speech-to-text model ("second speech-to-text model") to perform speech recognition of the assigned agent's spoken words.

As discussed above, in one embodiment, selector 202 selects a pre-trained speech-to-text model to perform speech recognition of an assigned agent's spoken words. In one embodiment, selector 202 is configured to assign an agent 104 to a customer 101. In one embodiment, such a selection is based on randomly selecting available agents 104 to handle the call from customer 101. In one embodiment, each agent has a profile that includes information about the agent, such as name, telephone number, a pre-trained speech-to-text model that performs the highest quality speech recognition, etc. In one embodiment, the speech-to-text model listed in the agent's profile is a baseline speech-to-text model that was trained using datasets, including audio data, provided by the agent. In one embodiment, such training is performed via speech customization software, such as Microsoft® Speech Studio, IBM Watson® Speech-to-Text, etc.

In one embodiment, audio files from agent 104 are collected and then transcribed by a human transcriber. Those audio files will then be translated into text by a baseline speech-to-text model. The accuracy of such a translation may then be determined by a translation expert. The translation expert may then adapt/customize the model to more closely match the transcription performed by the human transcriber, such as enhancing the existing baseline speech-to-text model with domain-specific terminology, acronyms, jargon, expressions, etc. In one embodiment, such customization may be performed using IBM Watson® Speech-to-Text.

In one embodiment, the pre-trained speech-to-text model to perform speech recognition of the agent's spoken words selected by selector 202 is based on a baseline speech-to-text model that is pre-trained with general words and terms commonly used by agents 104. Such a pre-trained model may apply to any of the agents 104 that are requested to assist customer 101. In one embodiment, such pre-training is performed using IBM Watson® Speech-to-Text.

In step 404, speech recognition module 203 of speech recognition system 102 caches the customer's spoken words as customer speech data, such as in cache 310, and caches the agent's spoken words as agent speech data, such as in cache 310.

As discussed above, in one embodiment, speech recognition module 203 caches the customer's spoken words as customer speech data, such as in cache 310 of speech recognition system 102. In one embodiment, such spoken words are recorded and then stored in a cache, such as a cache (e.g., cache 310) located within or externally to processor 301 of speech recognition system 102. In one embodiment, such recordation is performed by voice recording software, such as Audacity®, Adobe® Audition, Wavepad, Mixcraft® 9, Recordpad, etc.

In one embodiment, speech recognition module 203 caches the agent's spoken words as agent speech data, such as in cache 310 of speech recognition system 102. In one embodiment, such spoken words are recorded and then stored in a cache (e.g., cache 310), such as a cache located within or externally to processor 301 of speech recognition system 102. In one embodiment, such recordation is performed by voice recording software, such as Audacity®, Adobe® Audition, Wavepad, Mixcraft® 9, Recordpad, etc.

In step 405, analyzer 204 of speech recognition system 102 analyzes the combined results of the speech-to-text models (first and second speech-to-text models) used to process the customer's and agent's spoken words to generate a "reference speech-to-text result," which more accurately transcribes the customer's spoken words than the original speech-to-text model (first speech-to-text model) selected to perform speech recognition of the customer's spoken words. An illustration of generating the reference speech-to-text result is shown in FIG. 5.

Referring to FIG. 5, FIG. 5 illustrates an example of performing similarity analysis on the results of the speech-to-text models performing speech recognition of the customer's spoken words with respect to the reference speech-to-text result in accordance with an embodiment of the present disclosure.

As illustrated in FIG. 5, the result (STT result) 501 of the speech-to-text model performing speech recognition of the spoken words from customer 101 is "What are the previous <Product Name> version 10 installation?" 502.

Furthermore, as illustrated in FIG. 5, the result (STT result) 503 of the speech-to-text model performing speech recognition of the spoken words from agent 104 is "The prerequisites of <Product Name> version 10 installation include . . . " 504.

An analysis is performed on the combined results resulting in the reference speech-to-text (STT) result of "What are the prerequisites of <Product Name> version 10 installation?" 505. A discussion regarding such an analysis is provided below.

As discussed above, in one embodiment, analyzer 204 obtains the word embeddings from the output (text) generated by the speech-to-text model used to transcribe the customer's spoken words. A "word embedding," as used herein, is a presentation of words for text analysis, such as in a form of a real-valued vector that encodes the meaning of the word, such that the words that are closer in the vector space are expected to be similar in meaning. In one embodiment, such word embeddings are obtained using Word2vec. In one embodiment, Word2vec produces a vector space, typically of several hundred dimensions, from the inputted text (output of speech-to-text model used to transcribe the customer's spoken words), where each unique word is assigned a corresponding vector in the space. Word vectors are positioned in the vector space such that words that share common contexts in the corpus are located close to one another in the space.

Other methods for obtaining word embeddings by analyzer 204 from the output (text) generated by the speech-to-text model used to transcribe the customer's spoken words include binary encoding, term frequency encoding, term frequency-inverse document frequency encoding, latent semantic analysis encoding, etc.

In one embodiment, analyzer 204 performs contextual feature extraction (feature embeddings) of the output (text) generated by the speech-to-text model used to transcribe the agent's spoken words, such as using a Bidirectional Encoder Representations from Transformers (BERT) model. Using this bidirectional capability, BERT is pre-trained on two different, but related, natural language processing (NLP) tasks: masked language modeling and next sentence prediction. In one embodiment, such contextual features or feature embeddings refer to a feature representation where certain properties can be represented by notions of distance, such as a vector of numbers. In one embodiment, the BERT model produces feature embeddings that are dynamically informed by the words around them.

For example, in one embodiment, the input data (output (text) generated by the speech-to-text model used to transcribe the agent's spoken words) is modified to be in a specific format, with special tokens to mark the beginning and separation/end of sentences. Furthermore, the text is tokenized into tokens that correspond to BERT's vocabulary. For each tokenized sentence, BERT requires input identifiers, a sequence of integers identifying each input token to its index number in the BERT tokenizer vocabulary.

In one embodiment, the feature embeddings are obtained from the BERT model by summing a particular number of layers of transformer encoders, such as the last four layers of transformer encoders, where each output per token from each layer can be used as a feature embedding.

Such word embeddings and contextual features, as discussed above, are used by analyzer 204 to generate the "reference speech-to-text result" using an artificial neural network (e.g., recurrent neural network). A recurrent neural network (RNN), as used herein, is a type of artificial neural network which uses sequential data or time series data. In the RNN, connections between nodes form a directed graph along a temporal sequence which allows it to exhibit temporal dynamic behavior. Furthermore, recurrent neural networks can use their internal state (memory) to process sequences of inputs. By utilizing such a network, a more accurate translation of the customer's spoken words may result as discussed further below.

For example, a recurrent neural network, such as the long short term memory (LSTM) recurrent neural network or the gated recurrent units (GRU) recurrent neural network, is used to generate a more accurate translation of the customer's spoken words based on the recurrent neural network predicting the probability of the next word in the sequence based on the words already observed in the sequence. In one embodiment, the recurrent neural network uses a distributed representation where different words with similar meanings have similar representation and uses a large context of recently observed words when making predictions (predicting the next word in sequence).

Returning to FIG. 4A, in conjunction with FIGS. 1-3 and 5, in step 406, speech recognition module 203 of speech recognition system 102 generates a confidence rate of the speech-to-text result performed by the speech-to-text model (first speech-to-text model) used to perform speech recognition of the customer's spoken words. As used herein, the confidence rate refers to the reliability of the speech recognition results.

As discussed above, in one embodiment, the confidence rate is provided by the speech-to-text model, such as IBM Watson® Speech-to-Text. In one embodiment, the confidence rate corresponds to a value that is normalized between the values of 0 and 1.

In one embodiment, the confidence rate is determined using the reference speech-to-text result in which the output of the speech-to-text model used to perform speech recognition of the customer's spoken words is compared against the reference speech-to-text result. A word error rate may then be calculated based on the reference speech-to-text result, which corresponds to the number of substitutions, the number of deletions plus the number of insertions that need to be made in the output of the speech-to-text model used to perform speech recognition of the customer's spoken words to make it equivalent to the reference speech-to-text result, which is all divided by the number of words in the output of the speech-to-text model used to perform speech recognition of the customer's spoken words. The word error rate may then correspond to the confidence rate, which is normalized between a value of 0 and 1.

In one embodiment, the confidence rate is determined using a word confusion network for confidence modeling.

In one embodiment, the confidence rate is determined using a heterogeneous word confusion network involving a representation of multiple word confusion networks for a given utterance. In such an embodiment, a bidirectional lattice recurrent network is trained to obtain confidence values for every arc in the heterogeneous word confusion network.

In one embodiment, the confidence rate is computed as scores at the phonetic, word and utterance level. The scores are produced by extracting confidence features from the computation of the recognition hypotheses and processing these features using an accept/reject classifier for word and utterance hypotheses.

In step 407, a determination is made by speech recognition module 203 of speech recognition system 102 as to whether the confidence rate exceeds a threshold value, which may be user-selected.

If the confidence rate exceeds the threshold value, then, in step 408, speech recognition module 203 of speech recognition system 102 continues using the speech-to-text model selected in step 402 (speech-to-text model selected to perform speech recognition of the words spoken by the customer, such as the "first speech-to-text model") to perform speech recognition of the customer's spoken words during the ongoing call.

If, however, the confidence rate does not exceed threshold value (including the scenario of the confidence rate being equal to the threshold value), then, in step 409, speech recognition module 203 of speech recognition system 102 reprocesses the cached customer speech data with multiple speech-to-text models to perform speech recognition of the customer's spoken words. That is, the customer speech data that was processed by the first speech-to-text model is reprocessed by multiple other speech-to-text models. As discussed above, such speech recognition involves translating the customer's spoken words to text.

In step 410, analyzer 204 of speech recognition system 102 performs similarity analysis on the results of the speech-to-text models (see step 409) with respect to the reference speech-to-text result (see step 405).

As discussed above, in one embodiment, such a similarity analysis involves semantic similarity. In such an embodiment, the output text of the speech-to-text model and the reference speech-to-text result are converted into real-valued vectors, such as using word counts. In another embodiment, a neural net (e.g., two-layer neural net) may be used to vectorize the words, such as Word2vec. Once the output text of the speech-to-text model and the reference speech-to-text result are converted into real-valued vectors, a similarity measure, such as cosine similarity, may be used to determine the similarity between the two texts. Such a measure will result in a score (similarity score) between the values of 0 and 1 for vectors that have only positive values. In one embodiment, any negative scores can be made positive by taking its absolute value.

Referring now to FIG. 4B, in conjunction with FIGS. 1-3 and 5, in step 411, analyzer 204 of speech recognition system 102 assigns similarity scores for each of these speech-to-text models based on the similarity analysis. As discussed above, the similarity measure performed in step 410 results in a similarity score. In one embodiment, such a similarity score is normalized between the values of 0 and 1. An illustration of performing the similarity analysis on the results of the speech-to-text models performing speech recognition of the customer's spoken words with respect to the reference speech-to-text result is shown in FIG. 5.

Referring to FIG. 5, FIG. 5 illustrates the various speech-to-text (STT) models, such as STT models 506A-506N, where N is a positive integer, reprocessing the cached customer speech data 507 (discussed above in connection with step 409). STT models 506A-506N may collectively or individually be referred to as STT models 506 or STT model 506, respectively. Similarity analysis is then performed on the output (text) of such STT models. For example, similarity analysis is performed on the output text of STT model 506A ("STT Model 1"), which is "What are the prerequisites of <Product Name> version 2 installation?". In another example, similarity analysis is performed on the output text of STT model 506B ("STT Model 2"), which is "What are the prerequisites of <Product Name> version 10 installation?". In a further example, similarity analysis is performed on the output text of STT model 506N ("STT Model N"), which is "Where are the prerequisites of <Product Name> version 10 installation?".

Based on such an analysis, a similarity score is assigned to each of these STT models 506 based on the similarity of their output text with respect to the reference speech-to-text result 505. For example, the similarity score of 0.87 508A is assigned to STT model 506A. In another example, the similarity score of 1.0 508B is assigned to STT model 506B. In a further example, the similarity score of 0.6 508C is assigned to STT model 506N. As illustrated in FIG. 5, the closer the similarity between the output text of these STT models 506 with respect to the reference speech-to-text result 505, the higher the value of the similarity score. In one embodiment, the similarity score is normalized between the values of 0 and 1. Hence, a similarity score of 1 indicates an exact match, such as shown between the output text of STT model 506B and the reference speech-to-text result 505.

Returning to FIG. 4B, in conjunction with FIGS. 1-3 and 5, in step 412, selector 202 of speech recognition system 102 selects the speech-to-text model with the highest similarity score as the new speech-to-text model for speech-to-text processing of the customer's spoken words during the ongoing call. The selected speech-to-text model produces a higher quality of speech recognition than the originally selected speech-to-text model to perform speech recognition of the customer's spoken words. By selecting the speech-to-text model with the highest similarity score as the new speech-to-text model for speech-to-text processing of the customer's spoken words during the ongoing call, the speech recognition quality during the ongoing call is improved since a better speech-to-text model will be used to translate the customer's spoken words.

Referring again to step 407 of FIG. 4A, as discussed above, a determination is made by speech recognition module 203 of speech recognition system 102 as to whether the confidence rate exceeds a threshold value, which may be user-selected.

If the confidence rate does not exceed threshold value (including the scenario of the confidence rate being equal to the threshold value), then, in step 413, classifier 206 of speech recognition system 102 classifies the subject of the call based on an analysis of the customer and agent cached speech data.

As discussed above, in one embodiment, classifier 206 classifies the subject of the call based on identifying keywords in the text (translation of words spoken by customer). Such keywords are identified in data structures, such as a table, which are stored in database 105. Each keyword may be associated with a subject in the data structure. Based on matching one or more keywords in the data structure, one or more subjects (e.g., product A) of the call may be identified.

Referring now to FIG. 4C, in conjunction with FIGS. 1-3 and 5, in step 414, classifier 206 of speech recognition system 102 identifies the information that should be gathered based on the subject of the call.

As discussed above, in one embodiment, each subject is associated with a data structure (e.g., table) that includes a list of information that should be gathered during the phone call between customer 101 and agent 104. For example, if the subject pertained to the prerequisites of version #2 for product A, then certain information, such as the operating system of the computing device, should be gathered. In such an example, the subject of prerequisites of version #2 for product A may be associated with a data structure storing various information, such as the operating system of the computing device, that should be gathered.

In step 415, classifier 206 of speech recognition system 102 analyzes the customer and agent cached data to determine if any information that should have been gathered was not gathered.

As discussed above, in one embodiment, such an analysis is performed by classifier 206 using natural language processing in which keywords are searched in the customer and agent cached data based on the information that should be gathered for the identified subject(s) of the call. For example, if the subject of the prerequisites of version #2 for product A is associated with a data structure (e.g., table) that includes information that should be gathered, such as the operating system of the computing device used by customer 101, then classifier 206 searches for the keyword terms of "operating system" in the customer and agent cached data to determine if such information was gathered. If such information is not identified, then such information is deemed to be missing.

In step 416, question generator 207 of speech recognition system 102 determines whether classifier 206 identified any missing information that should have been gathered.

If classifier 206 did not identify any missing information that should have been gathered, then, in step 417, question generator 207 of speech recognition system 102 does not generate any questions to acquire missing information.

If, however, classifier identified missing information that should have been gathered, then, in step 418, question generator 207 of speech recognition system 102 generates questions for agent 104 to ask customer 101 to acquire the missing information.

As discussed above, in one embodiment, each information (e.g., operating system of the computing device) that needs to be acquired during the phone call pertaining to a subject of the call is associated with one or more questions to acquire such information. In one embodiment, such questions are stored in a data structure (e.g., table). In one embodiment, such a data structure is stored in a storage device (e.g., memory 305, disk drive 308) of speech recognition system 102. In one embodiment, such a data structure is stored in database 105.

For example, if classifier 206 determined that the information pertaining to the operating system of the computing device used by customer 101 was missing, then such information may be associated with a data structure (e.g., table) that stores question(s) to be asked to customer 101 to acquire such information. For example, the question of "What is the operating system of your computing device? (a) Microsoft®

Windows, (b) macOS®, (c) Linux®, (d) Android®, (e) iOS®" may be associated with the information pertaining to the operating system of the computing device used by customer 101. Such information may be acquired from the pertinent data structure by question generator 207.

In one embodiment, such questions are easy-to-answer questions in which customer 101 can answer such questions in simple words/sentences. In one embodiment, such questions are easy-to-answer multiple choice questions. In one embodiment, such questions are easy-to-answer questions that are designed to increase the accuracy of the translation thereby producing a higher quality speech-to-text result. An illustration of such easy-to-answer questions is shown in FIG. 6.

FIG. 6 illustrates an example of easy-to-answer questions that are generated for the agent to ask the customer in order to acquire missing information in accordance with an embodiment of the present disclosure.

Referring to FIG. 6, FIG. 6 illustrates the statement/question of "Let's check the status of prerequisites one by one. Have you installed <Product A>?" that was generated by question generator 207 to be used by agent 104 in obtaining the missing information from customer 101.

As illustrated in FIG. 6, such a question is spoken by agent 104 with the speech-to-text (STT) result 601 of "Let's check the status of prerequisites one by one. Have you installed <Product A>?" 602.

In response to such a an easy-to-answer question that encourages answers of simple words/sentences, customer 104 responds with a speech-to-text (STT) result 603 of "Yes" 604.

In response to such an answer, agent 104 further responds with another question which may have been provided by question generator 207 in response to an answer of "Yes" of the question previously provided by question generator 207. For example, as shown in FIG. 6, the question spoken by agent 104 has the speech-to-text (STT) result 605 of "Which version?" 606.

In response to such a an easy-to-answer question that encourages answers of simple words/sentences, customer 104 responds with a speech-to-text (STT) result 607 of "Version 4" 608.

By using intelligently generated and well organized questions, the customer is prevented from providing long sentences and complex information thereby improving speech recognition quality performed by the speech-to-text model.

Referring again to step 407 of FIG. 4A, as discussed above, a determination is made by speech recognition module 203 of speech recognition system 102 as to whether the confidence rate exceeds a threshold value, which may be user-selected.

If the confidence rate does not exceed threshold value (including the scenario of the confidence rate being equal to the threshold value), then, in step 419, trainer module 205 of speech recognition system 102 trains the speech-to-text models, such as those that are related to the initial speech-to-text model (first speech-to-text model) that performed speech recognition of the customer's spoken words. In one embodiment, such related speech-to-text models may correspond to those speech-to-text models that are targeted to perform speech recognition for the same geographical location (e.g., state of Texas in the United States of America) as the first speech-to-text model.

As discussed above, in one embodiment, such speech-to-text models are trained by trainer module 205 inputting the customer and/or agent cached speech data to the speech-to-text models, and then having the speech-to-text models compare their outputted text with the reference speech-to-text result. By performing speech recognition on the customer and/or agent cached speech data and then comparing the outputted text with the reference speech-to-text result, such models (e.g., IBM Watson® Speech-to-Text) may identify such discrepancies and learn from such discrepancies. In one embodiment, such discrepancies correspond to corrections in the transcription, which may be stored in a file and used by the model (e.g., IBM Watson® Speech-to-Text) to improve its accuracy.

In one embodiment, after the call is completed between customer 101 and agent 104, trainer module 205 may train speech-to-text models, such as those that are related to the initial speech-to-text model that performed speech recognition of the customer's spoken words, in the manner discussed above.

As a result of the foregoing, the embodiments of the present disclosure provide a means for providing high quality speech recognition via self-adaptive speech-to-text model reselection and continuous speech-to-text model self-training, tuning and customization.

Furthermore, the principles of the present disclosure improve the technology or technical field involving speech recognition. As discussed above, speech recognition is used in various technological areas, especially in call centers, where speech recognition software is used to handle incoming customer calls to improve productivity, customer satisfaction and cut costs. By transforming audio (e.g., customer's spoken words) into text-based words, events or words spoken during the telephone call can be indexed and searched. This indexable, searchable content can be used for training new agents and establishing best practices. However, the quality of such speech recognition performed by speech recognition systems may not be sufficient to accurately translate the spoken words into text. The accuracy of speech recognition depends on various factors, such as the language vocabulary size of the speech-to-text model, confusability of the spoken words, inbound audio quality, background noise, speaker's dialect, etc. For example, in a call center situation, inbound calls are not received from a single particular customer. Instead, the inbound calls may be received from thousands of different customers with different dialects and different background environments (e.g., music in the background, children in the background). Due to having customers, perhaps many thousands of customers, with different dialects and different background environments, a speech recognition system may need to pre-build thousands of speech-to-text models to translate speech into text to handle such scenarios. However, pre-building such a large number of speech-to-text models is not feasible due to cost. Furthermore, it is not easy to identify the particular pre-trained speech-to-text model that would most accurately translate the spoken speech from a particular customer with a particular dialect and background environment into text. As a result, current speech recognition systems fail to provide high quality speech recognition due to such challenges.

Embodiments of the present disclosure improve such technology by detecting an inbound call from a customer. A speech-to-text model ("first speech-to-text model") is selected to perform speech recognition of the customer's spoken words and a speech-to-text model ("second speech-to-text model") is selected to perform speech recognition of the agent's spoken words. The combined results of the speech-to-text models used to process the customer's and agent's spoken words are then analyzed to generate a reference speech-to-text result. Such an analysis may involve obtaining word embeddings and feature embeddings which are used by an artificial neural network (e.g., recurrent neural network) to generate the "reference speech-to-text result" which more accurately transcribes the customer's spoken words than the first speech-to-text model. A confidence rate of the speech-to-text result of the first speech-to-text model is generated. The "confidence rate," as used herein, refers to the reliability of the speech recognition results. The customer speech data that was processed by the first speech-to-text model is cached and reprocessed by other speech-to-text models in response to the confidence rate of the speech-to-text result of the first speech-to-text model being unsatisfactory, such as being less than a threshold value. A similarity analysis is then performed on the results (textual output) of these speech-to-text models with respect to the reference speech-to-text result. Similarity scores are then assigned to each of these speech-to-text models based on such similarity analysis, where the greater in similarity between the output text of these speech-to-text models with respect to the reference speech-to-text result, the higher the value of the similarity score. The speech-to-text model with the highest similarity score is then selected as the new speech-to-text model for speech-to-text processing of the words spoken by the customer during the call. In this manner, the quality of the speech recognition is improved, such as via self-adaptive speech-to-text model reselection. Furthermore, in this manner, there is an improvement in the technical field involving speech recognition.

The technical solution provided by the present disclosure cannot be performed in the human mind or by a human using a pen and paper. That is, the technical solution provided by the present disclosure could not be accomplished in the human mind or by a human using a pen and paper in any reasonable amount of time and with any reasonable expectation of accuracy without the use of a computer.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for providing high quality speech recognition, the method comprising:
    selecting a first speech-to-text model to perform speech recognition of words spoken by a customer;
    selecting a second speech-to-text model to perform speech recognition of words spoken by an agent;
    analyzing combined results of said first and said second speech-to-text models to generate a reference speech-to-text result;
    reprocessing cached customer speech data with a plurality of speech-to-text models to perform speech recognition of said customer's spoken words in response to a confidence rate of a speech-to-text result performed by said first speech-to-text model not exceeding a threshold value;
    performing a similarity analysis on results of said plurality of speech-to-text models with respect to said reference speech-to-text result;
    assigning similarity scores for each of said plurality of speech-to-text models based on said similarity analysis; and
    selecting one of said plurality of speech-to-text models with a highest similarity score as a new speech-to-text model for speech-to-text processing of words spoken by said customer during an ongoing call.

2. The method as recited in claim 1, wherein said first speech-to-text model is selected based on user call history or a geographical location of an inbound call telephone number.

3. The method as recited in claim 1 further comprising:
    caching said words spoken by said customer corresponding to said cached customer speech data; and
    caching said words spoken by said agent corresponding to cached agent speech data.

4. The method as recited in claim 3 further comprising:
    detecting an in-bound call;
    classifying a subject of said call based on an analysis of said cached customer speech data and said cached agent speech data in response to said confidence rate of said speech-to-text result performed by said first speech-to-text model not exceeding said threshold value;
    identifying information that should be gathered based on said subject of said call; and
    analyzing said cached customer speech data and said cached agent speech data to identify missing information that should have been gathered but was not gathered.

5. The method as recited in claim 4 further comprising:
    generating questions for said agent to ask said customer to acquire said identified missing information.

6. The method as recited in claim 3 further comprising:
    utilizing said cached customer speech data and said cached agent speech data as well as said reference speech-to-text result to train speech-to-text models related to said first speech-to-text model.

7. The method as recited in claim 1, wherein said confidence rate of said speech-to-text result performed by said first speech-to-text model is determined based on analyzing said reference speech-to-text result.

8. A computer program product for providing high quality speech recognition, the computer program product comprising one or more computer readable storage mediums having program code embodied therewith, the program code comprising programming instructions for:
    selecting a first speech-to-text model to perform speech recognition of words spoken by a customer;
    selecting a second speech-to-text model to perform speech recognition of words spoken by an agent;
    analyzing combined results of said first and said second speech-to-text models to generate a reference speech-to-text result;
    reprocessing cached customer speech data with a plurality of speech-to-text models to perform speech recognition of said customer's spoken words in response to a confidence rate of a speech-to-text result performed by said first speech-to-text model not exceeding a threshold value;
    performing a similarity analysis on results of said plurality of speech-to-text models with respect to said reference speech-to-text result;
    assigning similarity scores for each of said plurality of speech-to-text models based on said similarity analysis; and selecting one of said plurality of speech-to-text models with a highest similarity score as a new speech-to-text model for speech-to-text processing of words spoken by said customer during an ongoing call.

9. The computer program product as recited in claim 8, wherein said first speech-to-text model is selected based on user call history or a geographical location of an inbound call telephone number.

10. The computer program product as recited in claim 8, wherein the program code further comprises the programming instructions for:
    caching said words spoken by said customer corresponding to said cached customer speech data; and
    caching said words spoken by said agent corresponding to cached agent speech data.

11. The computer program product as recited in claim 10, wherein the program code further comprises the programming instructions for:
    detecting an in-bound call;
    classifying a subject of said call based on an analysis of said cached customer speech data and said cached agent speech data in response to said confidence rate of said speech-to-text result performed by said first speech-to-text model not exceeding said threshold value;
    identifying information that should be gathered based on said subject of said call; and
    analyzing said cached customer speech data and said cached agent speech data to identify missing information that should have been gathered but was not gathered.

12. The computer program product as recited in claim 11, wherein the program code further comprises the programming instructions for:
    generating questions for said agent to ask said customer to acquire said identified missing information.

13. The computer program product as recited in claim 10, wherein the program code further comprises the programming instructions for:
    utilizing said cached customer speech data and said cached agent speech data as well as said reference speech-to-text result to train speech-to-text models related to said first speech-to-text model.

14. The computer program product as recited in claim 8, wherein said confidence rate of said speech-to-text result performed by said first speech-to-text model is determined based on analyzing said reference speech-to-text result.

15. A system, comprising:
    a memory for storing a computer program for providing high quality speech recognition; and
    a processor connected to said memory, wherein said processor is configured to execute program instructions of the computer program comprising:
        selecting a first speech-to-text model to perform speech recognition of words spoken by a customer;
        selecting a second speech-to-text model to perform speech recognition of words spoken by an agent;
        analyzing combined results of said first and said second speech-to-text models to generate a reference speech-to-text result;
        reprocessing cached customer speech data with a plurality of speech-to-text models to perform speech recognition of said customer's spoken words in response to a confidence rate of a speech-to-text result performed by said first speech-to-text model not exceeding a threshold value;
        performing a similarity analysis on results of said plurality of speech-to-text models with respect to said reference speech-to-text result;
        assigning similarity scores for each of said plurality of speech-to-text models based on said similarity analysis; and
        selecting one of said plurality of speech-to-text models with a highest similarity score as a new speech-to-text model for speech-to-text processing of words spoken by said customer during an ongoing call.

16. The system as recited in claim 15, wherein said first speech-to-text model is selected based on user call history or a geographical location of an inbound call telephone number.

17. The system as recited in claim 15, wherein the program instructions of the computer program further comprise:
    caching said words spoken by said customer corresponding to said cached customer speech data; and
    caching said words spoken by said agent corresponding to cached agent speech data.

18. The system as recited in claim 17, wherein the program instructions of the computer program further comprise:
    detecting an in-bound call;
    classifying a subject of said call based on an analysis of said cached customer speech data and said cached agent speech data in response to said confidence rate of said speech-to-text result performed by said first speech-to-text model not exceeding said threshold value;
    identifying information that should be gathered based on said subject of said call; and
    analyzing said cached customer speech data and said cached agent speech data to identify missing information that should have been gathered but was not gathered.

19. The system as recited in claim 18, wherein the program instructions of the computer program further comprise:
    generating questions for said agent to ask said customer to acquire said identified missing information.

20. The system as recited in claim 17, wherein the program instructions of the computer program further comprise:
    utilizing said cached customer speech data and said cached agent speech data as well as said reference speech-to-text result to train speech-to-text models related to said first speech-to-text model.

* * * * *